No. 877,031.
PATENTED JAN. 21, 1908.
E. S. ACKERMAN.
VEHICLE BRAKE.
APPLICATION FILED APR. 8, 1907.
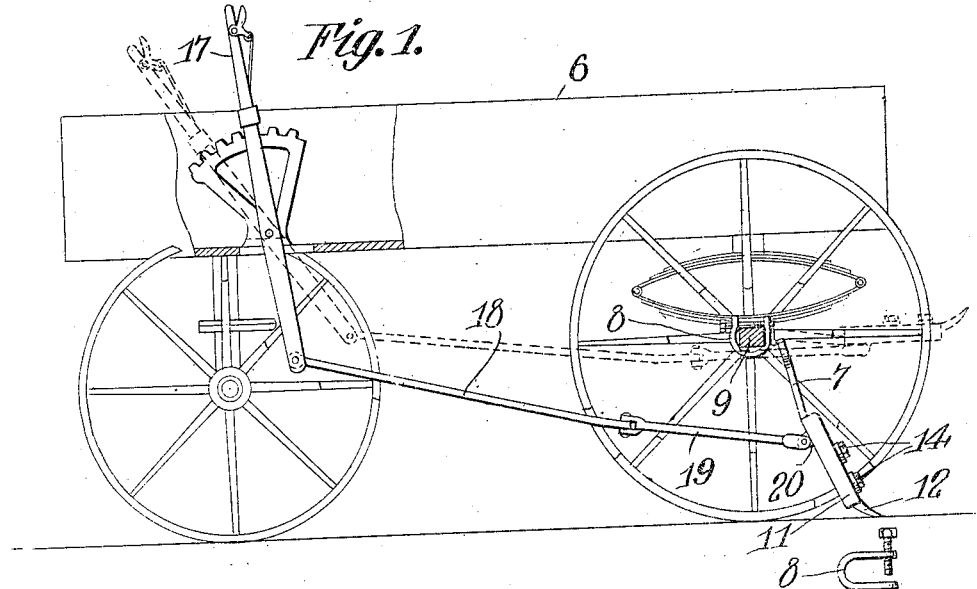
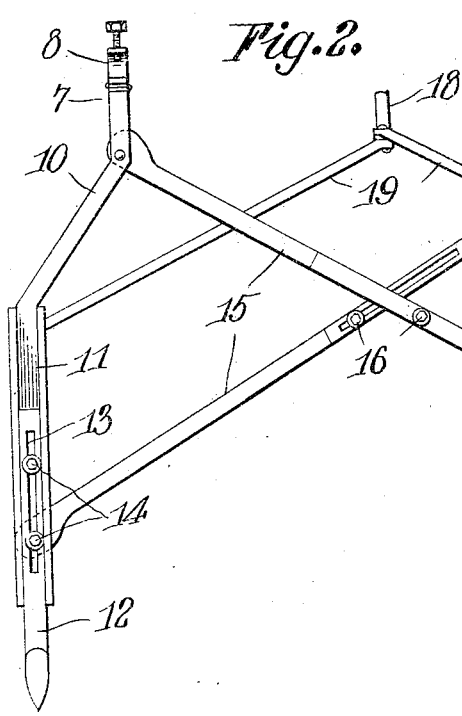
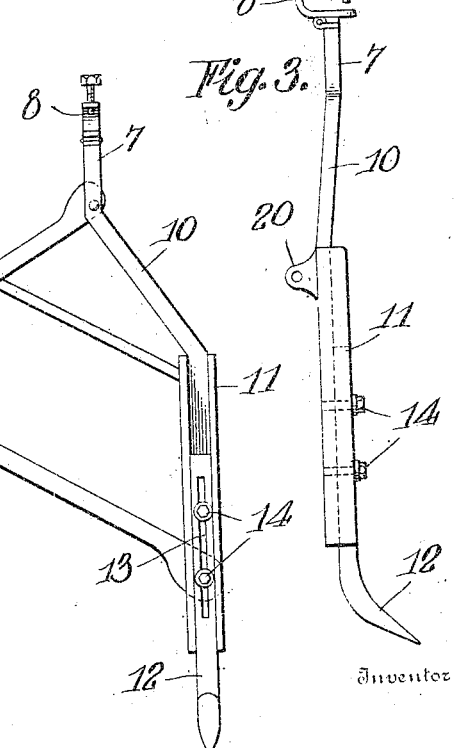
Witnesses
C. E. Smith
Geo. E. Tew
Inventor
Edwin S. Ackerman
Milo B. Stevens & Co.
Attorneys

UNITED STATES PATENT OFFICE.

EDWIN S. ACKERMAN, OF CLEVELAND, OHIO, ASSIGNOR OF ONE-HALF TO WILBUR E. CUNNINGHAM, OF CLEVELAND, OHIO.

VEHICLE-BRAKE.

No. 877,031.

Specification of Letters Patent.

Patented Jan. 21, 1908.

Application filed April 8, 1907. Serial No. 367,039.

*To all whom it may concern:*

Be it known that I, EDWIN S. ACKERMAN, a citizen of the United States, residing at Cleveland, in the county of Cuyahoga and State of Ohio, have invented certain new and useful Improvements in Vehicle-Brakes, of which the following is a specification.

This invention is a brake or chock for vehicles, and has for its object to provide an improved device to hold a wagon from backing down hill when the draft is stopped, and also to prevent side skidding or slide when the wagon is running free, as when running down hill.

The construction and operation of the device will be evident from the following description and the accompanying drawings, in which—

Figure 1 is a side elevation showing a wagon provided with the device. Fig. 2 is a rear view of the device, removed from the wagon. Fig. 3 is a side view of the parts shown in Fig. 2.

Referring specifically to the drawings, 6 indicates a wagon to which the invention is applied. The brake consists of a pair of bars 7 provided at the top with hooks 8 adapted to hook over the rear axle 9 of the wagon. Each of the bars 7 is offset as at 10 to bring the points a considerable distance apart and substantially behind the wheels. At the lower end the bars are provided with flanges or boxings 11, forming a channel in which is fitted and held the upper end of the shoes or points 12 which are bent rearwardly so as to readily engage in the ground when forced backward and also to bear in or down upon a road, after the manner of a runner, when moving forward. The upper end or shank of the shoe has a slot 13 which receives bolts 14 whereby it is attached to the bar 7, and whereby also it may be raised or lowered to bring the point to the proper position with respect to the ground. These bars 7 are connected by crossed braces 15, bolted at their opposite ends to the respective bars. The braces are made in two parts or sections which are connected by slot and bolts 16, by means of which the braces may be lengthened or shortened to bring the bars 7 closer together or farther apart, as may be necessary or desirable.

The hooked connection between the bars and the rear axle allows the device to be raised or lowered from or to the ground. This may be done from the driver's seat, by means of a lever 17 pivoted at the floor of the wagon and extending therethrough and connected by a rod 18 and branches 19 to ears 20 on the front side of the bars 7. By operating the lever the device is swung up or down in an obvious manner.

When the wagon stops while traveling up hill the device may be lowered to engage the points in the ground and so support the wagon without strain on the team. When the wagon is traveling down hill, the device may be lowered so that the points will bear frictionally against the ground and so act as a brake, and, also, when going fast, the shoes or points serve to steady the wagon and serve to prevent skidding or sliding from side to side, since the shoes will cut into the road, to a certain extent, after the manner of runners, and so tend to prevent slide or movement, any lateral swing of the bars 7 with respect to the wagon being prevented by the crossed braces 15.

The invention may be applied to and used on wagons, motor vehicles, and carriages of any kind.

I claim:

1. A vehicle brake comprising a pair of swinging bars connected to the vehicle and having shoes adapted to engage the ground and crossed extensible braces connecting said bars.

2. A vehicle brake comprising a pair of swinging bars connected to the vehicle and having shoes at their lower ends adapted to engage the ground, adjustable braces between the bars, a lever on the vehicle, and a connecting rod from the lever, having branch links connected to each bar.

In testimony whereof I affix my signature, in presence of two witnesses.

EDWIN S. ACKERMAN.

Witnesses:
JOHN A. BOMMHARDT,
EDITH D. COMER.